Figure 1:
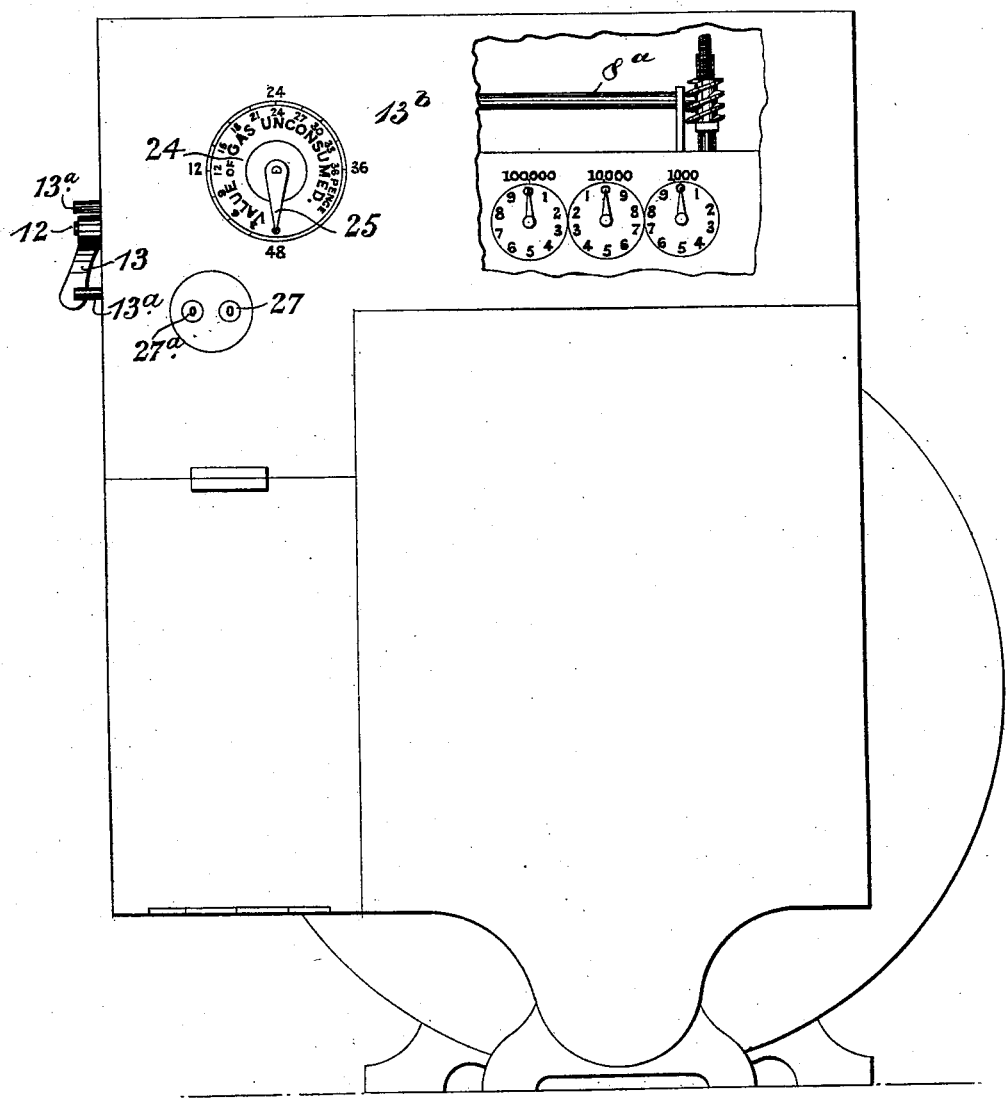

(No Model.) 9 Sheets—Sheet 1.

H. GREEN.
PREPAYMENT FLUID METER.

No. 606,625. Patented June 28, 1898.

WITNESSES: INVENTOR:

(No Model.) 9 Sheets—Sheet 2.

H. GREEN.
PREPAYMENT FLUID METER.

No. 606,625. Patented June 28, 1898.

WITNESSES:

INVENTOR:

(No Model.) 9 Sheets—Sheet 3.

H. GREEN.
PREPAYMENT FLUID METER.

No. 606,625. Patented June 28, 1898.

WITNESSES:
INVENTOR:

(No Model.)   9 Sheets—Sheet 4.
H. GREEN.
PREPAYMENT FLUID METER.
No. 606,625.   Patented June 28, 1898.
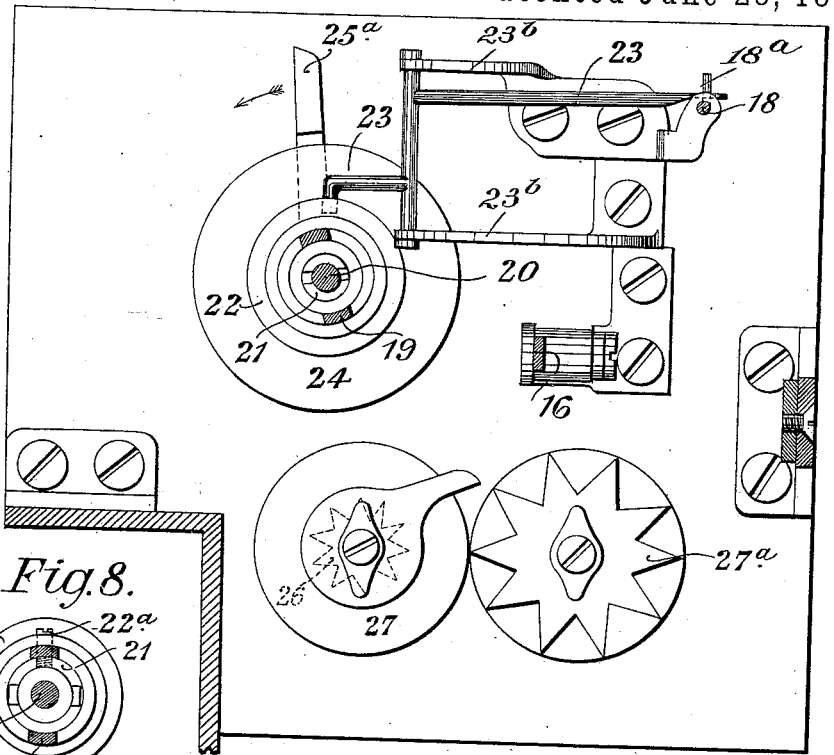
Fig. 6.
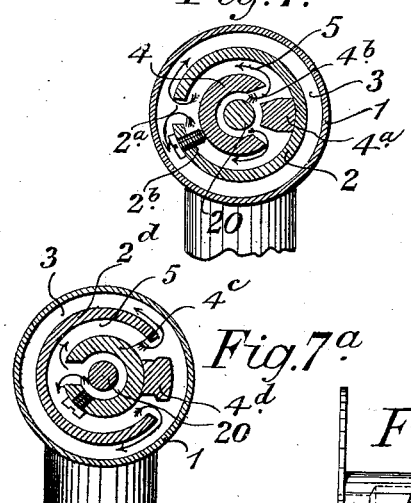
Fig. 8.
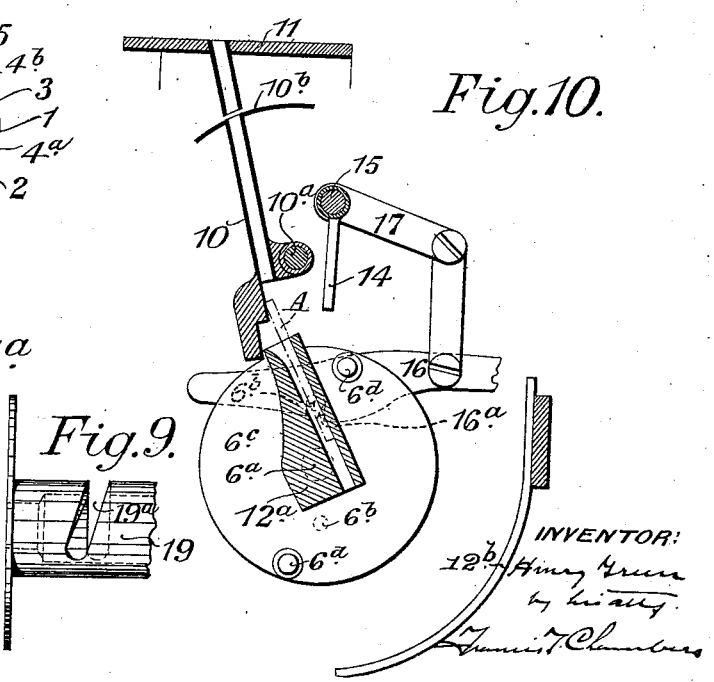
Fig. 7.
Fig. 7ᵃ.
Fig. 10.
Fig. 9.
WITNESSES:
INVENTOR:

(No Model.)  9 Sheets—Sheet 5.

H. GREEN.
PREPAYMENT FLUID METER.

No. 606,625. Patented June 28, 1898.

WITNESSES: INVENTOR:

THE NORRIS PETERS CO., PHOTO-LITHO., WASHINGTON, D. C.

(No Model.) 9 Sheets—Sheet 6.
H. GREEN.
PREPAYMENT FLUID METER.

No. 606,625. Patented June 28, 1898.

WITNESSES:

INVENTOR:

(No Model.) 9 Sheets—Sheet 7.

H. GREEN.
PREPAYMENT FLUID METER.

No. 606,625. Patented June 28, 1898.

WITNESSES:

INVENTOR:

(No Model.)

9 Sheets—Sheet 8.

H. GREEN.
PREPAYMENT FLUID METER.

No. 606,625. Patented June 28, 1898.

WITNESSES:

INVENTOR:

(No Model.)

H. GREEN.
PREPAYMENT FLUID METER.

No. 606,625. Patented June 28, 1898.

WITNESSES:

INVENTOR:

United States Patent Office.

HENRY GREEN, OF PRESTON, ENGLAND, ASSIGNOR TO HIMSELF, AND ALEXANDER C. HUMPHREYS AND ARTHUR GRAHAM GLASGOW, OF NEW YORK, N. Y.

PREPAYMENT FLUID-METER.

SPECIFICATION forming part of Letters Patent No. 606,625, dated June 28, 1898.

Application filed June 25, 1897. Serial No. 642,217. (No model.) Patented in England August 28, 1896, No. 19,067.

*To all whom it may concern:*

Be it known that I, HENRY GREEN, a subject of the Queen of Great Britain and Ireland, residing at Preston, in the county of Lancaster, England, have invented Improvements in Prepayment Fluid - Meters, (for which I have obtained a patent in Great Britain, No. 19,067, bearing date August 28, 1896,) of which the following is a specification.

In a prepayment-meter according to this invention there is a compound cock which comprises two hollow plugs, one adapted to be actuated by mechanism worked by the fluid-pressure (I will hereinafter assume the fluid to be gas) and the other adapted to be actuated by hand through appropriate mechanism when a coin is in or has been inserted into the proper part of the apparatus. The said two hollow plugs are so arranged that in certain relative positions they close the gas-passage, and then if a coin be inserted through the coin-slot of the meter and a handle provided for the purpose be actuated the one hollow plug may be actuated to a given extent, whereupon the gas-passage through the compound cock will be opened, and as gas flows the hollow plug that is in gear with the measuring mechanism will be actuated by the gas-pressure, so as, by the time the quantity of gas paid for has been delivered, to again close the gas-passage through the compound cock. Means are provided to prevent the hand-operated plug from making a complete rotation in relation to the gas-operated plug and so overrunning the latter and preventing delivery of the full quantity of gas paid for. Apparatus to operate on this principle may be constructed in various forms. The compound cock may comprise a couple of hollow conical plugs of peculiar construction arranged within a barrel, shell, or body resembling that of an ordinary cock. Furthermore, the mechanism, in connection with the one plug for enabling the same to be moved to a certain distance by hand after introduction of a coin, may be of any suitable description. Various known constructions of such mechanism may be adapted and combined with compound plugs according to my invention.

Figure 2:
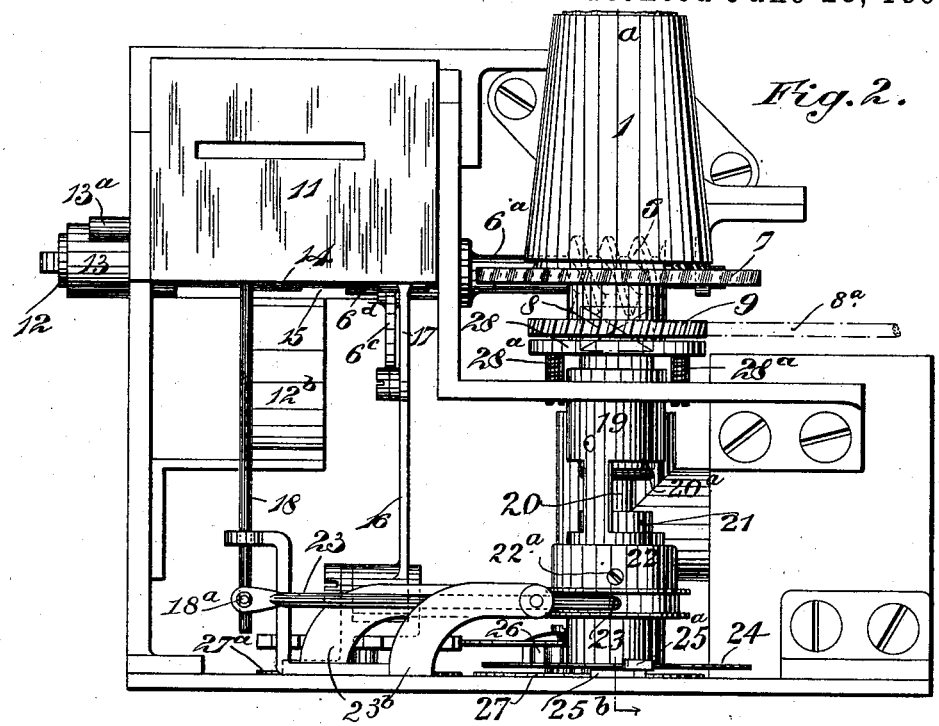
Figure 3:
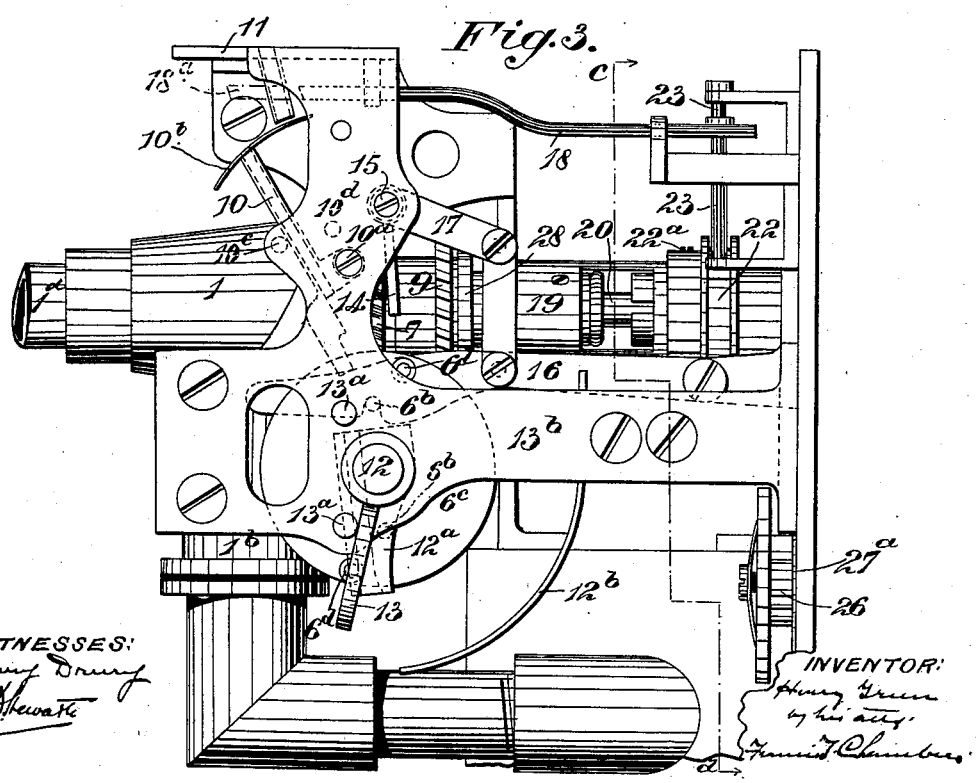
Figures 4, 5:
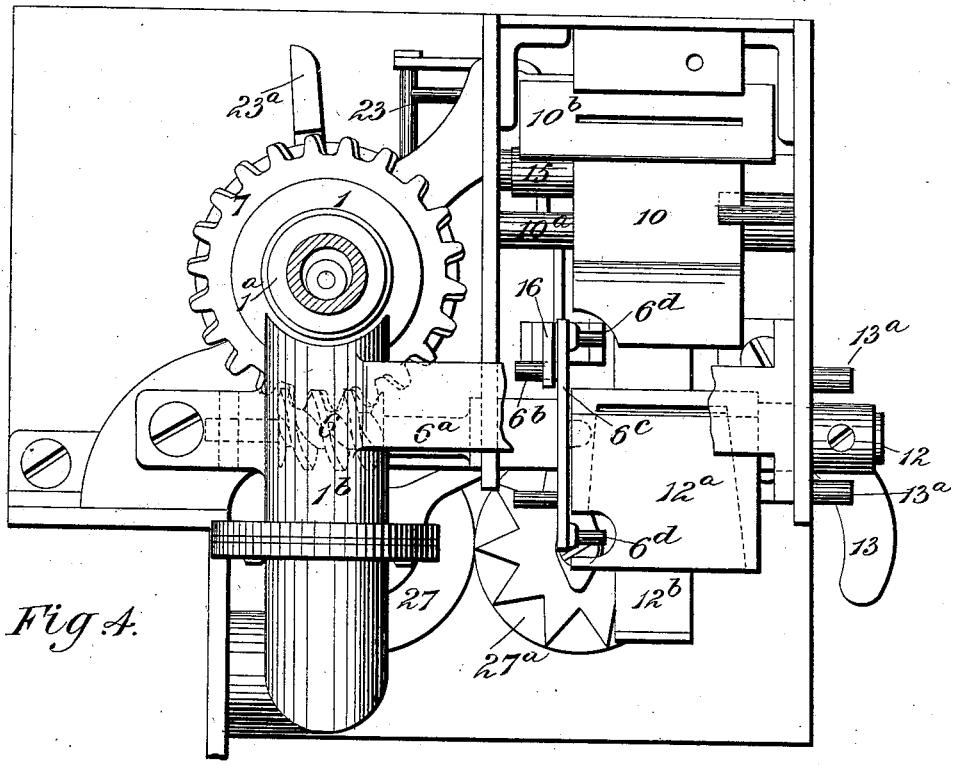
Figure 11:
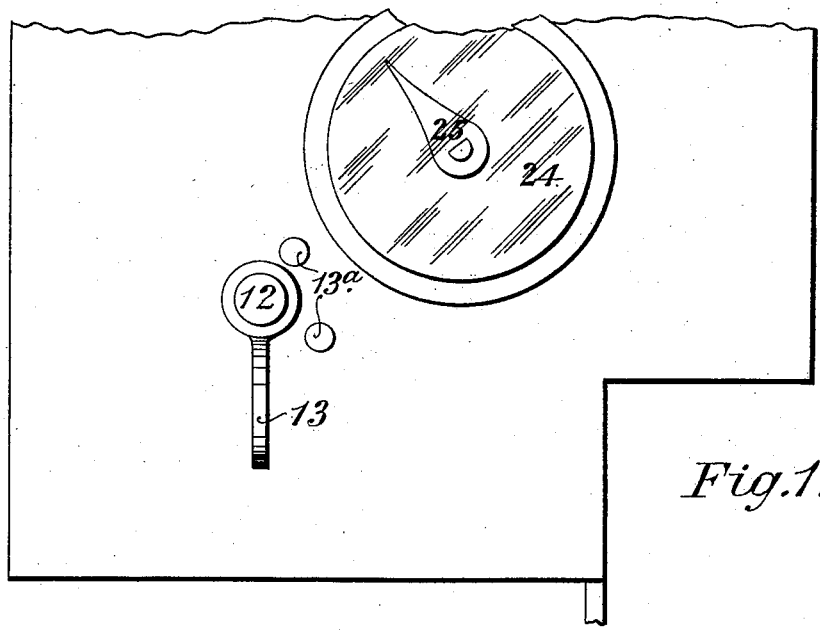
Figure 12:
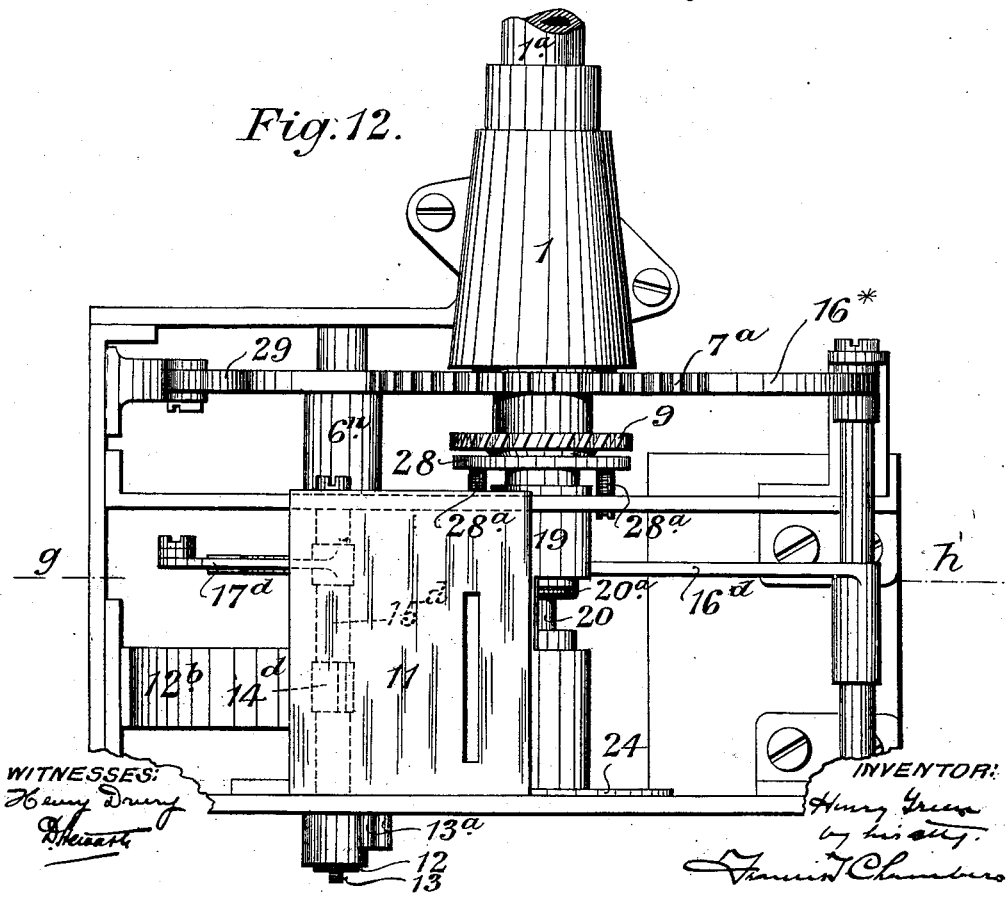
Figure 16:
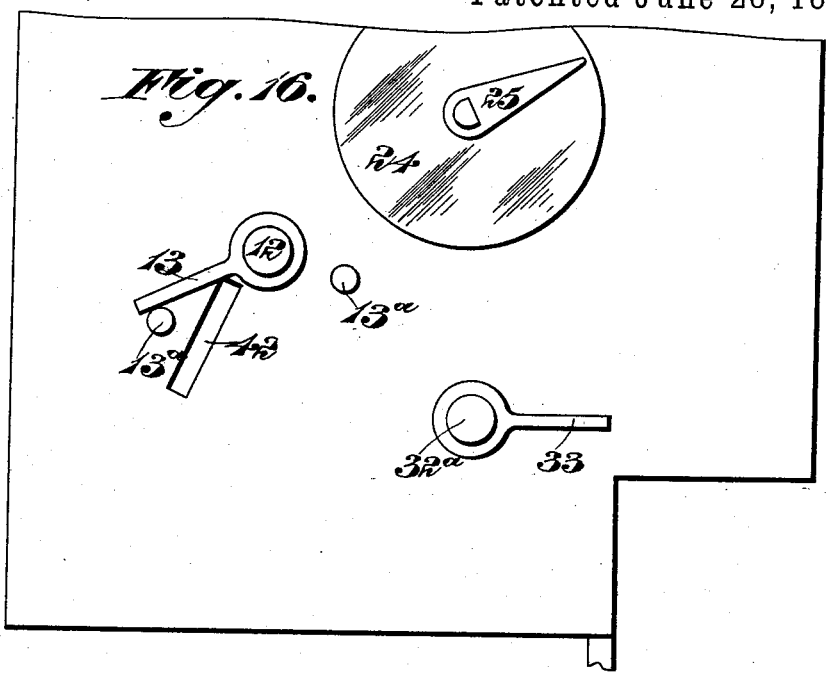
Figure 17:
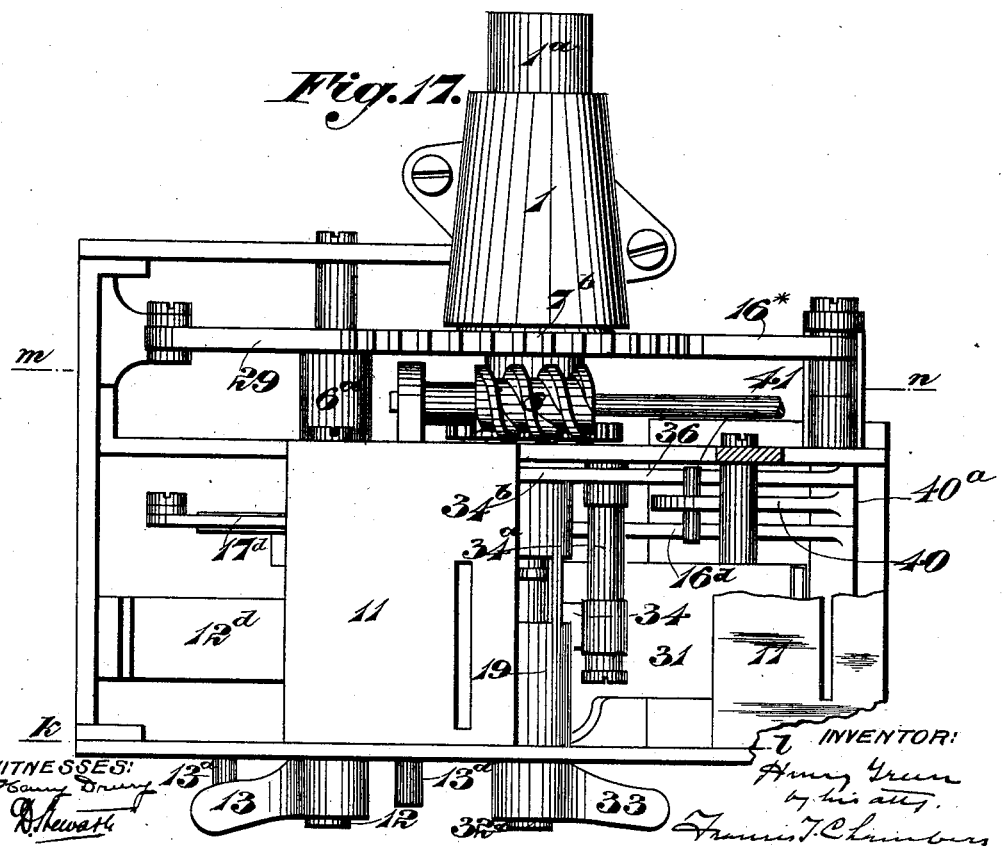
Figure 18:
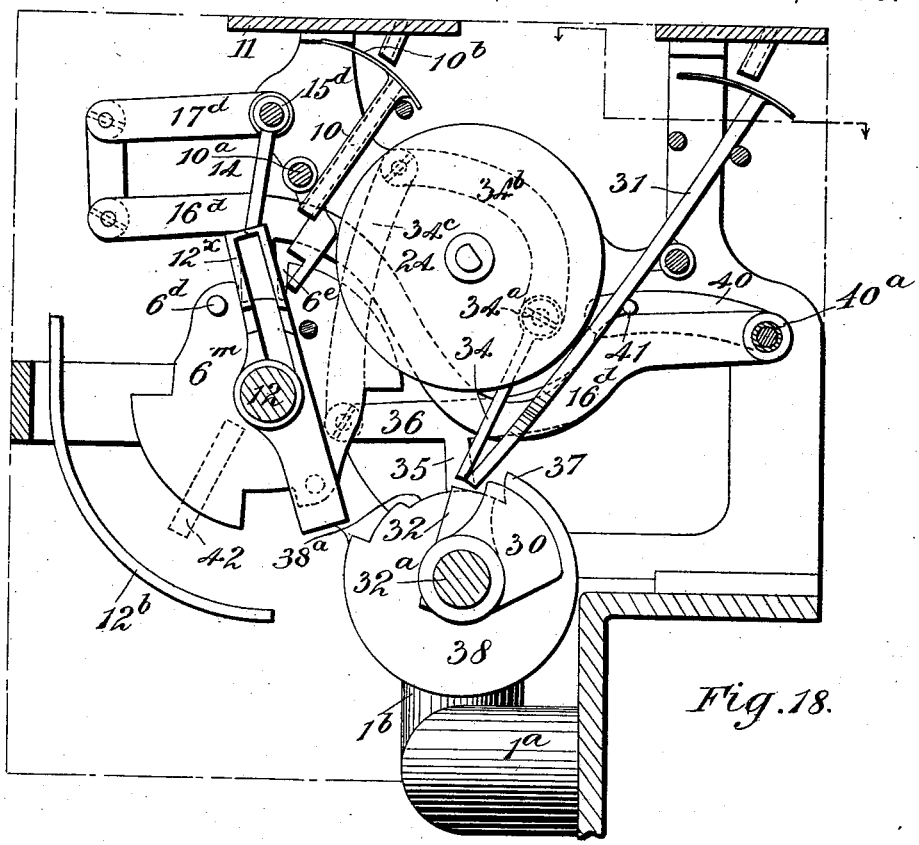
Figure 19:
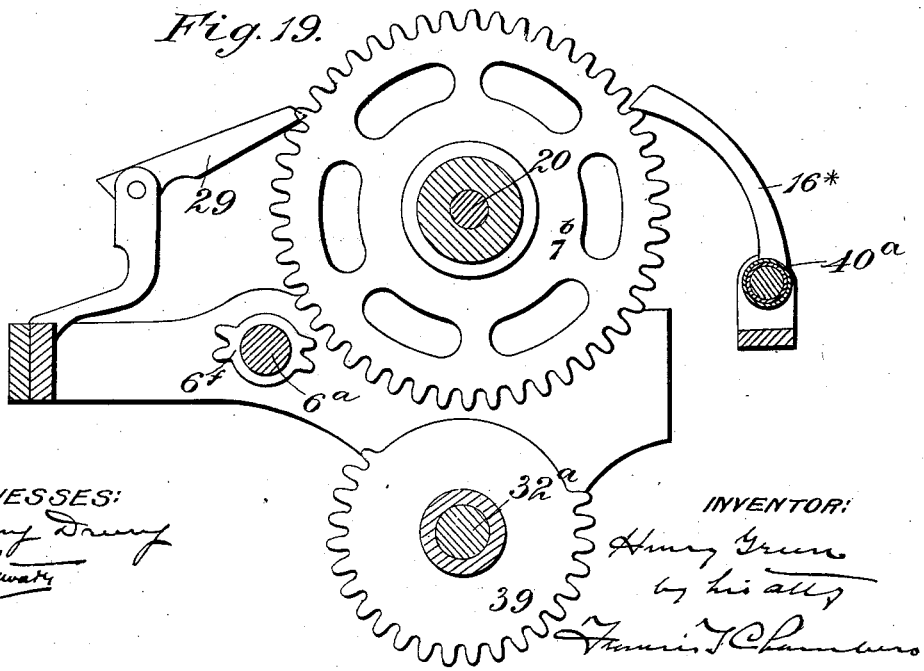

Referring to the accompanying illustrative drawings, Figure 1 is a front elevation of a prepayment gas-meter according to this invention. Figs. 2, 3, and 4 are respectively a plan, a side elevation, and a rear elevation of the compound gas-cock and coin freeing and operating mechanism of the meter shown in Fig. 1, drawn to a larger scale. Fig. 5 is a section on the line $a\ b$, Fig. 2; Fig. 6, a section on the line $c\ d$, Fig. 3; and Fig. 7, a section of the compound cock on the line $e\ f$, Fig. 5. Fig. 7$^a$ is a similar view to Fig. 7, showing a modification. Figs. 8, 9, and 10 are detail views hereinafter more fully referred to. Fig. 11 is a front elevation, Fig. 12 a plan, and Fig. 13 a section on the line $g\ h$, Fig. 12, showing a modification of the coin freeing and operating mechanism of a prepayment gas-meter according to this invention. Fig. 14 is a side elevation, and Fig. 15 a section on the line $i\ j$, Fig. 14, of coin freeing and operating mechanism of a prepayment gas-meter adapted to be operated by a shilling according to this invention. Fig. 16 is a front elevation. Fig. 17 is a sectional plan, and Figs. 18 and 19 are sections on the lines $k\ l$ and $m\ n$, Fig. 17, respectively, of an arrangement of apparatus adapted for delivering two different quantities of gas for two different coins—for example, a pennyworth and also a shilling's worth of gas.

Corresponding parts in the several arrangements are indicated by similar reference characters.

I have not deemed it needful to illustrate the measuring apparatus in detail. In the examples the measuring portions of the meter are supposed to be those of a wet meter of ordinary kind; but it will be evident that apparatus according to my invention may be combined with measuring mechanism of other constructions so long as the arrangement be such that one plug of the compound cock will be actuated by the fluid and the other can be moved by hand, as set forth.

My compound gas-meter cock, as shown more particularly in Figs. 5 and 7, is as follows: The barrel 1 is conical, with gas-inlet 1$^a$ at the small end and delivery 1$^b$ at the side. Within this is the outer hollow plug 2, formed as a hollow truncated cone fitting the interior of the barrel near its end portions, but made of reduced external diameter between those portions, so as to form an annular gas-chamber 3 all around between the exterior of the outer plug and the interior of the barrel. Through the wall of the outer hollow plug there is an opening $2^a$, through which when it is not closed by the inner hollow plug 4 gas will flow. The inner hollow plug is of an external form adapted to fit within the outer one at its end portions and also for a portion of the circumference connecting the said end parts, which portion will hereinafter be called the "closing part" $4^a$. The remainder of the inner hollow plug is open or made, as shown, of a reduced external diameter, so as to form between it and the interior of the outer plug 2 a chamber 5, extending almost entirely around the inner plug. Through the walls of the reduced part of the inner plug there is or are one or more openings $4^b$, (two are shown in Fig. 7,) through which the gas can flow into the chamber 5 between the inner and outer plugs. The outer plug is actuated by hand through a worm 6 and worm-wheel 7, Fig. 4, the latter being fixed on the plug. The inner plug is actuated from the meter proper through a worm 8, Fig. 2, gearing with a worm-wheel 9, fixed on the spindle of the plug, the said worm 8 being fixed on a shaft $8^a$, that is operated from the measuring mechanism of the meter. $2^b$, Fig. 7, is a pin which prevents the plug 2 making a complete rotation relatively to the plug 4 by coming in contact with the closing part $4^a$.

The above-mentioned Figs. 5 and 7 illustrate clearly the above-described arrangement of compound gas-cock, and it will be seen from them that the chambers 3 and 5 might be formed by making an annular recess in the inner surface of the barrel instead of the outer surface of the plug 2 and in the inner surface of the plug 2 instead of in the outer surface of the plug 4, or that the chamber 3 might be formed partly in the barrel and partly in the plug 2 and the chamber 5 partly in the plug 2 and partly in the plug 4.

In Fig. $7^a$ I have shown a slight modification involving the location of the closing part $4^d$ upon the outer plug $2^d$ instead of the inner plug $4^e$, the openings in the two plugs being correspondingly formed.

The coin freeing and operating mechanism shown in Figs. 1 to 10 is as follows: There is a coin-chute 10, Figs. 3 and 10, pivoted at $10^a$ beneath a slotted plate 11, and below it there is mounted on a short shaft 12 a coin-holder $12^a$, which in one position of the said parts— namely, that shown in Fig. 10, which is a detail sectional view of the coin slot, chute, and holder—has its open and wider end upward and opposite to, but below the lower end of, the chute, so that a coin A dropped into the chute, will enter the coin-holder and be supported therein in the position indicated in dotted lines. On the shaft 12 there is an external arm or handle 13, by which it can be moved in a rotary sense. Assuming a coin to be in the holder, if its shaft be then turned the coin will be caused, by acting on an arm 14, projecting from a rock-shaft 15, to actuate a locking device, so as to release the shaft $6^a$ of the worm 6 that is in gear with the outer plug 2. The locking device shown comprises a lever 16, which is linked to a lever-arm 17, projecting from the rock-shaft 15, and is formed with a notch $16^a$, adapted to become engaged with one or other of a pair of rearwardly-projecting studs $6^b$ on a disk $6^c$, fixed to the worm-shaft $6^a$. As the coin-holder is further moved after the release of the shaft $6^a$ a part of the coin will come into contact with one of a pair of forwardly-projecting studs $6^d$ on the disk $6^c$, so as to turn the worm-shaft $6^a$ during the remainder of the forward movement of the coin-holder. The coin is prevented from falling out of the holder until the completion of the stroke by a guard-plate $12^b$. Thus during such further movement the outer plug 2 will be turned through the worm 6 and worm-wheel 7. On the termination of the stroke the coin-holder will be upside down and the coin will fall into a coin-receptacle. By the operation just described the opening $2^a$ through the wall of the outer plug 2 will have been moved from opposite the closing part $4^a$ of the inner plug, so that gas will flow in the direction of the arrows, Figs. 5 and 7, assuming delivery to be taking place, and as the gas flows and so works the meter the latter will, through the shaft $8^a$, worm 8, and worm-wheel 9, actuate the inner plug, so as, by the time the quantity of gas paid for has been delivered, to bring its closing part $4^a$ again opposite to the opening of the outer plug, thus again closing the gas-passage, and so on. After the coin in the coin-holder shall have, in the above-described operation, cleared the arm 14 the lever 16 will have resumed a position in which it will be in readiness to become engaged, during the rotation of the worm-shaft $6^a$ and disk $6^c$, with the other stud, $6^b$, on the disk, so as to lock the shaft $6^a$ at the end of its partial rotation until by the insertion of another coin and partial rotation of the coin-holder the driving-shaft $6^a$ of the outer plug 2 is again released in the manner already indicated. The movement of the handle 13 is limited by stop-pins $13^a$, fixed to the framework $13^b$, carrying the coin freeing and operating mechanism.

To prevent coins being inserted when the parts are not in position to enable a coin to fulfil its office in the apparatus, the upper part of the coin-chute or each such chute, when there are more than one, is arranged below the slotted plate 11, which may be the cover of the apparatus, is provided with a plate or closing device $10^b$ and is so mounted as to assume a position in which the coin-slot will be closed or partly closed whenever a partial forward movement of the coin-holder $12^a$ having been effected such holder has not completed the movement necessary to permit delivery of the gas already paid for and been returned into the proper position for receiving a fresh coin. If it be attempted to return the holder before the coin drops out, the arm 14 will prevent the coin-holder being brought into contact with the chute 10, but during the return movement of the coin-holder after the ejection of the coin the opening of the coin-slot is effected by the coin-holder abutting against the lower part of the coin-chute, the upper part of which is arranged to play between stops 10$^c$ 10$^d$. This, however, may be done in various ways. The chute may be fixed and a separate closing device be provided in connection with the coin-holder shaft or some moving part of the apparatus, so that the slot-closing plate will be operated independently of the chute for opening and closing the coin-slot.

The apparatus is so arranged that only a limited number of coins can be inserted into it one after the other before consumption of gas occurs. When the maximum number of coins has been inserted and the handle 13 operated a corresponding number of times, further rotation of the plug 2 relatively to the plug 4 is prevented by the pin 2$^b$ abutting against the part 4$^a$. If another coin were then allowed to be inserted, an attempt to further rotate the outer plug might result in the machine being strained or the pin 2$^b$ being sheared off. In order to prevent this, the coin-slot through the plate 11 may be blocked shortly before the pin 2$^b$ comes into contact with the part 4$^a$ by means of a sliding bar 18, to which motion is given at the required time in the following manner: To the outer end of the inner plug 4 is fixed a tubular extension 19, (shown separately in Fig. 9,) that is formed with a slot 19$^a$, which for a part of its length is at right angles to the axis of the extension 19, but toward its outer end is inclined. To a cross-bar 2$^c$, Fig. 5, at the inner end of the plug 2 is fixed a spindle 20, that extends centrally through the hollow outer end of the inner plug 4 into the extension 19 and is there fitted with a sleeve 21, that is attached to it by a pin-and-slot connection, so that the sleeve can move lengthwise upon but cannot turn about the spindle 20. Upon the extension 19 is mounted a grooved collar 22, which is fixed to the sleeve 21 by a pin 22$^a$, that passes through the slot 19$^a$. When the gas-passage through the compound cock is closed, the pin 22$^a$ will pass through the straight portion of the slot; but as the outer plug 2 is rotated relatively to the inner plug the sleeve 21 will be correspondingly rotated relatively to the slotted extension 19 and the pin 22$^a$ will thus be caused to travel toward the inclined part of the slot, and if sufficient coins be inserted without consumption of gas taking place to enable the outer plug to be turned almost a complete rotation relatively to the inner plug the pin 22$^a$ will travel along the inclined part of the slot, whereby the sleeve 21 and collar 22 will be moved lengthwise of the extension 19. This longitudinal movement of the collar 22 is communicated to the bar 18 by a two-armed lever 23, the shorter arm engaging within the groove of the collar 22 and the longer arm engaging a pin 18$^b$ upon the bar 18, said lever being, moreover, mounted to rock within bearings formed by brackets 23$^b$, attached to the frame of the apparatus. The bar 18 is thus caused to assume the forward position indicated by dotted lines at 18$^a$ in Fig. 3 and thus prevent the insertion of another coin until the consumption of gas causes the rotation of the inner plug 4 relatively to the plug 2, when the collar 22 will be moved back to its normal position and the bar 18 withdrawn. 20$^a$ is a stuffing-box to prevent leakage of gas around the spindle 20.

24 is an indicator-disk (see Figs. 1 and 5) fixed to the extension 19, that is rotated with the plug 4, and 25 is a pointer or index attached to the spindle 20, that rotates with the outer plug 2. They are arranged opposite an opening 13$^c$ in the face of the frame or casing 13$^b$ of the apparatus, and the disk is graduated and numbered, so that their relative positions will show the quantity or value of the gas paid for and unconsumed at a given time.

To enable the number of coins that have been inserted into the apparatus to be ascertained at a glance, figures are so placed around the opening 13$^c$ in the casing that up to a certain number the position of the pointer 25 relatively to these figures will indicate how many coins have been inserted. To indicate the number of inserted coins in excess of the number indicated by the pointer 25, the said pointer may be formed with an extension 25$^a$, Fig. 6, that engages once in each revolution with a star-wheel 26, which communicates motion to additional indicating-disks 27 27$^a$, which will, together with the pointer 25 and the figures on the front of the casing, record the total number of coins that have been inserted into the apparatus.

28, Figs. 2 and 5, is a ring loosely mounted on the outer end of the inner plug 4 and which can be caused, by means of screws 28$^a$ passing through the framework of the apparatus, to bear with more or less pressure against the face of the wheel 9, (or other laterally-projecting portion of the plug 4,) so as to maintain a tight joint between the plug 2 and the barrel 1 of the cock and also between the two plugs.

Figure 13:
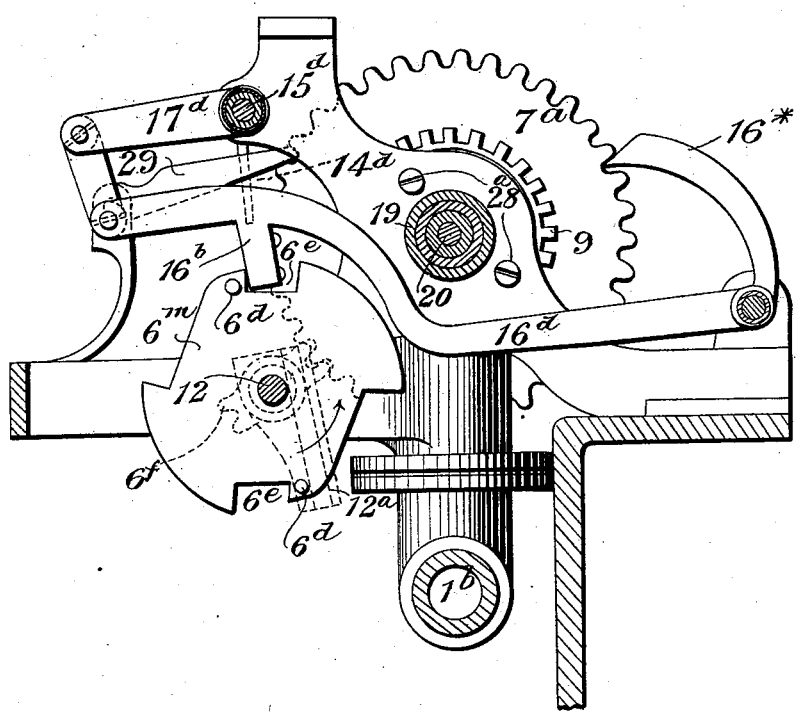
Figure 14:
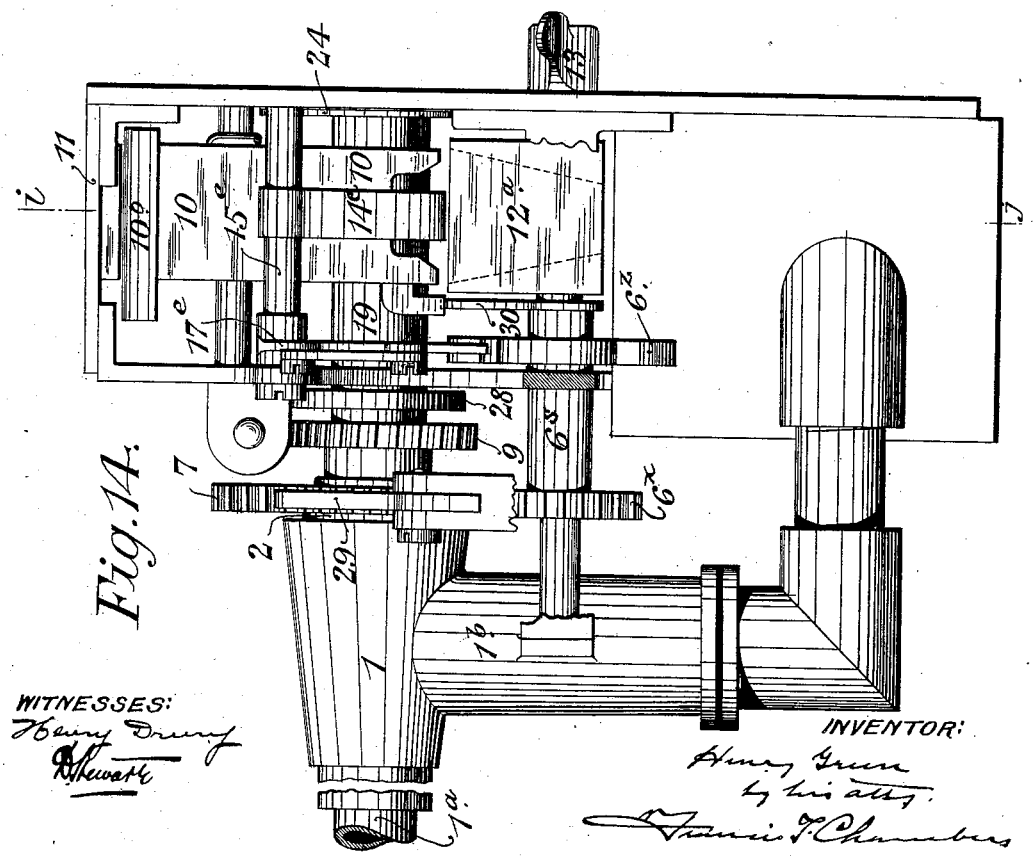

The modified construction of coin freeing and operating mechanism shown in Figs. 11, 12, and 13 is similar to that shown in Figs. 1 to 10, inclusive; but instead of employing worm-gear for communicating motion from the handle 13 to the outer plug 2 I employ spur-gear and somewhat modify the releasing mechanism. The shaft 12 of the coin-holder 12$^a$ (shown in dotted lines, Fig. 13) is in this case arranged in line with the shaft 6$^n$ of a mutilated pinion 6$^f$, having in the example two pairs of teeth arranged diametrically opposite and adapted to engage with the toothed wheel $7^a$. The disk or plate $6^m$ is formed with two notches $6^e$, and the lever $16^d$ is formed with a detent or tooth $16^b$, that engages in one or other of the notches and prevents rotation of the shaft $6^m$ until it is raised by a coin in the coin-holder (which in order to operate the said shaft is turned in the direction indicated by the arrow, Fig. 13) coming in contact with the arm $14^d$ on the rock-shaft $15^d$. The lever $16^d$ has connected to it a pawl $16^x$, which normally engages with the wheel $7^a$ and prevents the plug 2 turning with the inner plug when the latter is driven by the meter. This pawl $16^x$ after being raised comes into engagement again with the wheel 7 as soon as the plate $6^m$ has been rotated by means of a coin acting against one of the studs $6^d$ sufficiently to bring its circular portion from beneath the detent $16^b$, by which time the teeth of the pinion $6^f$ will be out of gear with the wheel $7^a$. On the plate $6^m$ being further rotated the detent $16^b$ will enter the other notch $6^e$ and prevent further rotation until another coin is inserted. A detent 29 prevents backward movement of the wheel $7^a$.

The arrangements above described are suitable for what is known as a "penny-in-the-slot" meter; but I may construct meters according to my invention adapted to deliver a larger quantity of gas for a coin of greater value than a penny—as, for instance, a shilling—or I may combine in one meter arrangements for delivering two different quantities of gas for two different coins—as, for example, a pennyworth of gas in the case of a penny being inserted into the one slot or a shilling's worth of gas in the case of a shilling being dropped into the other slot.

Figure 15:
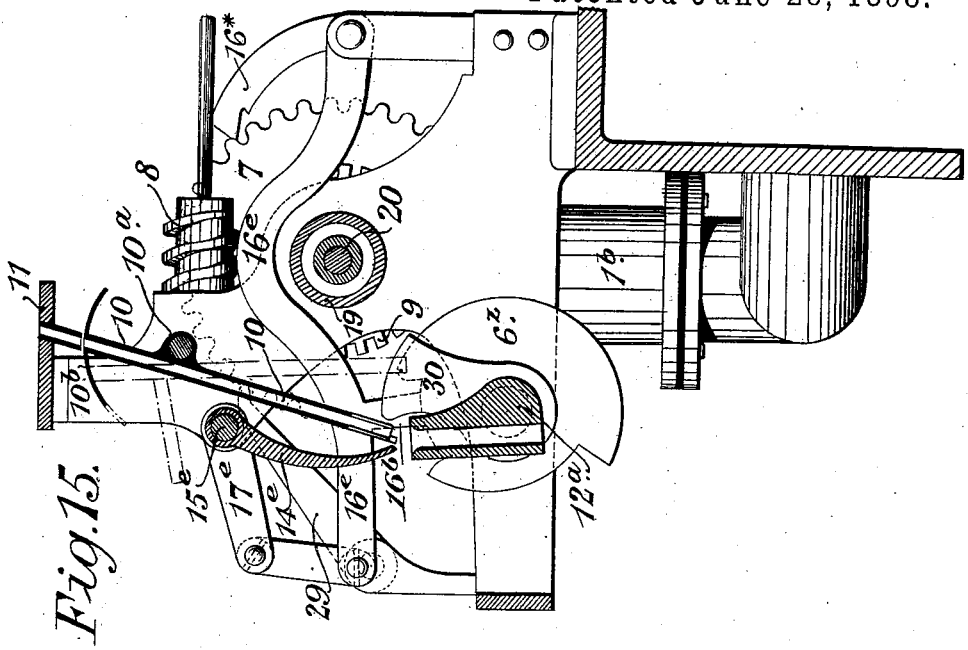

Figs. 14 and 15 show an arrangement of mechanism adapted to be operated by a shilling. The mutilated pinion $6^x$ is in this case formed with a number of consecutive teeth. The pinion $6^x$, disk-plate $6^z$, coin-holder $12^a$, handle 13, and a cam 30, hereinafter referred to, are fixed on a single shaft $6^s$, and the handle 13 and coin-holder $12^a$ are adapted to make a complete revolution after the insertion of each coin. The coin in this example acts merely to release the pinion $6^x$, which is driven directly from the handle 13 through the shaft on which both are fixed, there being sufficient play between the disk $6^z$ and the detent $16^b$ to permit of the locking-lever being operated by a coin in the coin-holder. The cam 30 during the completion of each revolution comes in contact with the chute 10 and brings it into line with the coin-holder and coin-slot at the moment the handle 13 reaches its initial position, and then after the insertion of a coin moves and for a time retains the chute 10 out of line with the coin-slot. After the cam 30 has moved from beneath the lower end of the chute 10 the latter swings back to the position indicated in dotted lines, Fig. 15, in which the plate $10^b$ closes the coin-slot.

The parts $14^e$ $15^e$ $16^e$ $17^e$ correspond in function to the like parts of the preceding modifications, as will be readily understood.

Figs. 16 to 19, inclusive, show an arrangement of apparatus adapted for delivering two different quantities of gas for different coins. This arrangement resembles that already described with reference to Figs. 11, 12, and 13, but with the following addition: There is a separate chute 31 for shillings and a separate coin-holder 32 for the same, and when a shilling is dropped into that coin-holder and the holder by a handle 33 on its shaft $32^a$ is then partly rotated the coin, acting on a lever-arm 34, removes a detent, tooth, or stop 35 out of the path of a projection 37 from a plate 38, carried by the shaft $32^a$, on which is fixed a toothed wheel 39, at the same time actuating the locking device $16^x$, forming part of the mechanism for delivering pennyworths of gas. The arm 34 is fixed to a rock-shaft $34^a$, carrying a lever-arm $34^b$, that is connected by a link $34^c$ to the free end of the lever 36. In order that the raising of either the lever $16^b$ or the lever 36 by a coin shall raise the locking-pawl $16^x$ out of engagement with the teeth of the wheel $7^b$ and so leave this wheel free to be rotated through the corresponding handle 13 or 33, the pawl $16^x$ is connected by a sleeve $40^a$ to a lever-arm 40, carrying a cross-bar 41, which when the apparatus is not being operated through a coin rests upon both the lever $16^b$ and 36. Thus if either lever is raised the lever-arm 40 will also be raised, thereby moving the pawl $16^x$, so as to release the wheel $7^b$. The said toothed wheel 39 makes a complete rotation after the insertion of a shilling and has such a number of teeth that it will drive the wheel $7^b$ and connected plug 2 through a portion of a rotation twelve times as great as that through which the plug 2 is driven by the pinion $6^f$ at each operation, the pinion turning only half a revolution after the insertion of each coin. In order that the shilling-holder may be partly rotated without actuating the plug and that the wheel $7^b$ may be left free to be turned by the pinion $6^f$, the wheel 39 is made without teeth for a part of its circumference. (See Fig. 19.) The gaps in the pinion $6^f$ also allow the wheel $7^b$ to be rotated by the wheel 39. In order to keep the locking device out of gear until the plug 2 has been moved into a position corresponding to the delivery of the shilling's worth of gas, or thereabout, the disk-plate 38 on the coin-shaft $32^a$ has its rim extending through part of a circle only, and on this rim the detent or tooth 35 is supported until the circular portion of the rim has traveled from under it, by which time the wheels 39 and $7^b$ will be out of gear, whereupon the tooth 35, falling into a notch, gap, or break $38^a$ in the rim, returns to its locking position and allows the locking-pawl $16^x$ to do the same. The notch $38^a$ is so formed that it limits by engagement with the tooth 35 the extent to which the shilling-holder shaft can be moved. The coin-holder 12ª is formed with a hollow part 12ˣ, that has an open end working against the casing of the apparatus, and which when the coin-holder is raised into position to receive a coin is lowered. When the coin-holder and chute are in line, the open end of the part 12ˣ is opposite a slot 42 in the front of the casing, through which a coin of a smaller size than a penny, if dropped into the penny-slot, will return to the party inserting it.

The above arrangements may be modified by adapting the inner plug to be operated by hand after the introduction of the coin and the outer plug to be actuated by the mechanism worked by the gas flowing through the meter, and the gas-inlet may be at the side of the barrel and the gas-outlet at the small end thereof. Also, the prepayment mechanism may be arranged to control the inlet of gas to the measuring portions of the meter, as in the examples illustrated, or to control the outlet of gas from the meter.

What I claim is—

1. In a prepayment-meter, the combination with mechanism adapted to be worked by fluid-pressure and mechanism adapted to be worked by hand, of a compound cock adapted to control the flow of fluid through the meter and comprising two plugs one of which is adapted to be turned by the said hand-worked mechanism into a position in which it will open a passage through said cock and the other of which is adapted to be turned by the mechanism worked by the fluid-pressure into a position in which it will close the said passage, the hand-worked mechanism and the corresponding plug being inoperative until a proper coin has been inserted in such apparatus.

2. In a prepayment-meter, a compound cock comprising two hollow plugs arranged concentrically within a barrel or shell and adapted to control the flow of fluid through said meter, mechanism whereby one of said plugs can be operated by hand, coin-operated mechanism controlling said mechanism, mechanism in driving connection with the other of the two plugs and with the measuring apparatus of the meter, and means for preventing the hand-operated plug from overrunning the fluid-operated plug.

3. In a prepayment-meter, the combination with mechanism adapted to be worked by fluid-pressure, and mechanism adapted to be worked by hand but constructed to be inoperative except when a proper coin is inserted therein, of a compound cock comprising a barrel or shell and two hollow plugs arranged concentrically one within the other, shaped to fit one another at the ends and to form an intermediate circumferential chamber between the plugs and a similar chamber between the outer plug and the barrel or shell, each of said plugs being mounted to turn independently of the other and formed with a fluid-passage, and one of them being provided with a closing part adapted by rotation of one plug to close the fluid-passage in the other plug, means connecting one plug with the hand-worked mechanism whereby it can be turned to a position in which it will open a passage through the cock, and means connecting the other plug with the mechanism worked by the fluid-pressure, whereby it is turned to a position to close said passage.

4. A prepayment-meter comprising a meter proper with measuring mechanism, a compound cock adapted to control the flow of fluid through said meter and having two hollow plugs arranged concentrically within a barrel or shell and each provided at its outer end with a driving-wheel, mechanism in driving connection with one of said wheels and its plug and with the measuring apparatus of the meter, a shaft provided with means for engaging and rotating the other wheel and its plug and with a driving disk or plate, a locking device for said driving disk or plate, a rotary coin-holder adapted to support a coin in position to operate said locking device to release said driving disk or plate, and to partly rotate said disk or plate when the same is unlocked, substantially as described.

5. In a prepayment-meter the combination of a compound cock comprising concentrically-arranged plugs adapted to control the flow of gas through said meter and provided with separate driving-wheels 7 and 9 at their outer ends, driving mechanism in connection with said wheel 9 and with the measuring apparatus of the meter, a shaft provided with means for engaging and driving said wheel 7 and with a plate having locking-pins 6ᵇ, and driving-pins 6ᵈ a rotary shaft with coin-holder 12ª and operating-handle, a locking device comprising a slotted lever adapted to normally engage one or other of said pins 6ᵇ and a lever-arm connected to said slotted lever and arranged in the path of a coin carried by said coin-holder, said driving-pins 6ᵈ being also arranged in the path of said coin, a guard-plate 12ᵇ arranged below said coin-holder, a slotted plate 11, a pivoted coin-chute 10 arranged below said plate and adapted to be brought in line with the slot therein and above the receptacle in the coin-holder when the same is turned upward, and a closing device 10ᵇ adapted to close the slot in said plate when said coin-holder is moved in a direction to unlock said disk, substantially as described and for the purposes specified.

6. In a prepayment-meter, the combination with a compound cock comprising concentrically-arranged plugs adapted to control the flow of gas through said meter, coin-operated mechanism whereby one of said plugs can be turned by hand after the insertion in said mechanism of a proper coin, mechanism whereby the other of said plugs can be turned by the measuring apparatus of the meter, and a plate with a coin-slot, of a tubular extension 19 connected to one of said plugs and formed with a slot 19ᵃ having a part of its length at right angles to said extension, and another part inclined thereto, a spindle fixed to the other plug and connected by a pin-and-slot connection to a sleeve adapted to move lengthwise upon but not to turn about said spindle, a pin fixed to said sleeve and extending through said slot, a collar mounted to slide on said extension and fixed to said pin, a lever arranged to be operated by said collar, and a bar adapted to be moved by said lever across the slot in said plate, substantially as described and for the purpose specified.

7. A prepayment-meter comprising a meter proper with measuring apparatus, a compound cock having two concentrically-arranged hollow plugs adapted to control the flow of fluid through said meter, actuating mechanism arranged in connection with one of said plugs and worked by pressure of fluid flowing through the meter and two sets of coin-controlled hand-operated apparatus adapted to be independently connected to the other plug, whereby the combined apparatus is adapted for delivering different quantities of fluid in exchange for coins of different values, substantially as described.

8. A prepayment-meter comprising a meter proper with measuring apparatus, a compound cock having two concentrically-arranged hollow plugs adapted to control the flow of fluid through said meter and provided with driving-wheels 7 and 9 respectively, actuating mechanism arranged in driving connection with said wheel 9 and with the measuring apparatus of the meter, two sets of coin-freed mechanism each comprising a coin-chute, a rotary coin-holder arranged below said chute, a shaft provided with a mutilated toothed wheel adapted to gear with said wheel 7 and provided with a slotted or recessed plate and capable of being rotated, when released, through said coin-holder, a locking-lever having a detent or tooth that normally holds said plate with the corresponding mutilated wheel out of engagement with said wheel 7, and a lever-arm arranged in the path of a coin held by the coin-holder and connected with said locking-lever, the mutilated wheel of one coin-freed mechanism having a greater number of teeth than that of the other coin-freed mechanism, a detent arranged to prevent backward rotation of said wheel 7, a pawl that normally prevents said wheel 7 rotating in the opposite direction, and means connected with said pawl and adapted to be operated by each locking-lever so that said pawl will be moved out of engagement with said wheel when either locking-lever is operated to release its corresponding slotted or recessed plate, substantially as described for the purpose specified.

In testimony whereof I have signed my name to this specification in the presence of two subscribing witnesses.

HENRY GREEN.

Witnesses:
HERBERT BLOREM,
F. J. NEWBOUND.